United States Patent [19]

Abthoff et al.

[11] 4,186,705
[45] Feb. 5, 1980

[54] INSTALLATION FOR THE PREHEATING OF THE SUCTION MIXTURE OF A CARBURETOR INTERNAL COMBUSTION ENGINE

[75] Inventors: Jörg Abthoff, Plüderhausen; Ludwig Fricker, Stuttgart; Jürgen Lammer, Korb, all of Fed. Rep. of Germany

[73] Assignee: Daimler-Benz Aktiengesellschaft, Fed. Rep. of Germany

[21] Appl. No.: 872,559

[22] Filed: Jan. 26, 1978

[30] Foreign Application Priority Data

Jan. 29, 1977 [DE] Fed. Rep. of Germany ....... 2703720

[51] Int. Cl.$^2$ ............................................. F02M 31/00
[52] U.S. Cl. ...................... 123/122 AC; 123/122 AB; 261/144; 261/145
[58] Field of Search ................. 123/122 AC, 122 AA, 123/122 AB, 122 A; 165/105; 261/144, 145

[56] References Cited

U.S. PATENT DOCUMENTS

| | | | |
|---|---|---|---|
| 1,430,792 | 10/1922 | Brush | 123/122 AC |
| 3,924,592 | 12/1975 | Miyaki | 123/122 AB |
| 3,963,012 | 6/1976 | Harned | 123/122 AC |
| 3,965,681 | 6/1976 | Wyczalek | 123/122 AB |
| 3,977,378 | 8/1976 | Harned | 123/122 AC |
| 4,022,172 | 5/1977 | Fingeroot | 123/122 AC |

FOREIGN PATENT DOCUMENTS

2625822  9/1976  Fed. Rep. of Germany ... 123/122 AC

*Primary Examiner*—Ronald H. Lazarus
*Attorney, Agent, or Firm*—Craig and Antonelli

[57] ABSTRACT

An installation for preheating the suction mixture of a carburetor internal combustion engine with a heat pipe extending from a place of the exhaust gas line system to a place of the suction pipe system and with a heat-absorption zone, on the one hand, and a heat emission zone on the other; the heat pipe leads from its heat-absorption zone to a lower part of the suction pipe directly adjoining the carburetor outlet and in its heat emission zone partly surrounds with its flat condenser jacket from below the flow channel of this pipe along a wall surface area while leaving free the main part of the pipe cross section.

6 Claims, 3 Drawing Figures

INSTALLATION FOR THE PREHEATING OF THE SUCTION MIXTURE OF A CARBURETOR INTERNAL COMBUSTION ENGINE

The present invention relates to an installation for preheating the suction mixture of a carburetor internal combustion engine.

It is known in the prior art to preheat the mixture of air and fuel of an internal combustion engine flowing through the suction line by the utilization of the exhaust gas heat and above all during the cold start, where the temperatures of the sucked-in air and of the fuel supplied thereto by the carburetor, which are present with a still cold internal combustion engine, do not yet suffice to adequately evaporate the fuel. In contradistinction thereto, with a warmed-up internal combustion engine operating at its normal temperatures, according to experience one may reckon with a sufficiently complete evaporation of the fuel in the combustion air so that in this case a preheating of the sucked-in mixture is unnecessary and also undesirable as regards the volumetric efficiency of the engine which is reduced thereby.

The preheating of the sucked-in mixture was initially disclosed directly by the exhaust gases which were fed to an external wall place of the suction pipe by way of an exhaust gas branch line and a throttle valve control. However, such a construction of the installation for the preheating of the suction mixture is disadvantageous since the throttle valve continuously exposed to the hot exhaust gases during the operation of the internal combustion engine corrodes in its bearing supports excessively rapidly.

The aforementioned shortcoming is avoided by an installation disclosed in the U.S. Pat. No. 2,418,548, in which a heat pipe leading from a location of the exhaust gas line system to a location of the suction pipe system and having, on the one hand, a heat-absorption zone, and, on the other, a heat-emission zone, is used for preheating the suction mixture of a carburetor internal combustion engine. Nonetheless, also this installation is still disadvantageous in the practical applications which have become known so far because the heat-emission zone of the heat pipe has thereat the shape of a pipe heat-exchanger disposed in the suction line owing to which a corresponding pressure decrease and a corresponding power output loss of the internal combustion engine are unavoidable. Therebeyond, such installations with heat pipes corresponding to the disclosed embodiments of this prior art patent have become known heretofore only in counterflow engines in which the heat pipe leads from a lower exhaust gas line upwardly to the heat-exchanger extending through the suction pipe disposed thereabove.

The present invention is concerned with the task to so complete and perfect the aforementioned installation that no significant throttling of the sucked-in mixture can take place any longer due to the presence of the preheating installation and therebeyond it can be used with all types of internal combustion engines independent of the arrangement of the suction and exhaust gas lines.

The underlying problems are solved according to the present invention in that the heat pipe leads from its heat-absorption zone to a lower part of the suction pipe directly adjoining the carburetor outlet and in its heat emission zone partly surrounds with a flat condenser jacket from below the flow channel of the suction pipe along a wall surface area while leaving free the main part of the pipe cross section.

It has been found surprisingly that with the proposed construction of the heat-emission zone of the heat pipe as flat condenser jacket partly surrounding the suction pipe directly adjoining the carburetor, a complete evaporation of the fuel component which remains still non-evaporated in the fuel/air mixture can be achieved in this manner without the need for the suction stream of the mixture to experience a significant throttling. Therebeyond, the thus-constructed preheating installation is not tied to any particular location of the heat pipe and can therefore be applied to all types of internal combustion engines having suction and exhaust gas lines.

Accordingly, it is an object of the present invention to provide an installation for preheating the suction mixture of a carburetor internal combustion engine which avoids by simple means the aforementioned shortcomings and drawbacks encountered in the prior art.

Another object of the present invention resides in an installation for the preheating of the suction mixture of a carburetor internal combustion engine, which is simple in construction, yet avoids any pressure drop or power loss of the engine due to the presence of the preheating system.

A further object of the present invention resides in an installation for preheating the suction mixture of a carburetor internal combustion engine in which no movable parts are present that might be subject to corrosion as a result of exposure to hot exhaust gases.

Another object of the present invention resides in an installation for preheating the suction mixture of a carburetor internal combustion engine which is highly effective for its intended purposes, yet is substantially service-free over long periods of operation.

Still another object of the present invention resides in an installation for preheating the suction mixture of a carburetor internal combustion engine which is not tied to any particular type of internal combustion engine but can be used with all types of internal combustion engines.

These and other objects, features and advantages of the present invention will become more apparent from the following description when taken in connection with the accompanying drawing which shows, for purposes of illustration only, two embodiments in accordance with the present invention, and wherein.

Figure 1:
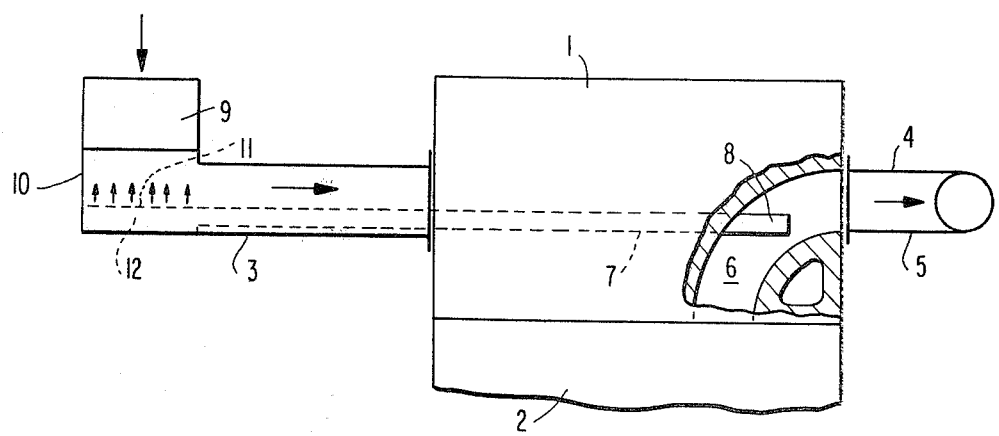
FIG. 1 is a schematic end elevational view, partly in cross section, of an internal combustion engine provided with a cross-flow cylinder head and with a preheating installation according to the present invention for preheating the suction mixture.

Referring now to the drawing wherein like reference numerals are used throughout the various views to designate like parts, the cylinder head 1 of the carburetor internal combustion engine 2 merely schematically indicated in FIG. 1 is constructed as cross-flow cylinder head, whereby the suction pipe system 3 is arranged on one side thereof and the exhaust gas line system 4 on the other side thereof. Of the working cylinders, outlet channels each terminate in an exhaust gas pipe connection 5 belonging to the exhaust gas line system 4, of which one exhaust channel 6 is shown in cross section in FIG. 1. A heat pipe 7 of conventional construction which extends through the cylinder head 1 from the suction side thereof projects into at least one exhaust channel 6, and more particularly according to FIG. 1 into the exhaust channel 6 illustrated in cross section; the heat pipe 7 at the same time contains in its part projecting into the exhaust channel 6 a heat-absorption zone constructed as evaporator 8. The other end of the heat pipe 7 leads in a heat-transfer or heat-emission zone underneath the carburetor 9 constructed as downdraft carburetor to a part of the suction pipe 10 located thereat which directly adjoins the carburetor 9, where the heat-emission zone surrounds the flow channel thereof along one wall surface area 11 while leaving free the main part of the pipe cross section. The heat-transfer or heat-emission zone where heat is given off is thereby constructed as flat condenser jacket 12 surrounding this wall surface area.

Figure 2:
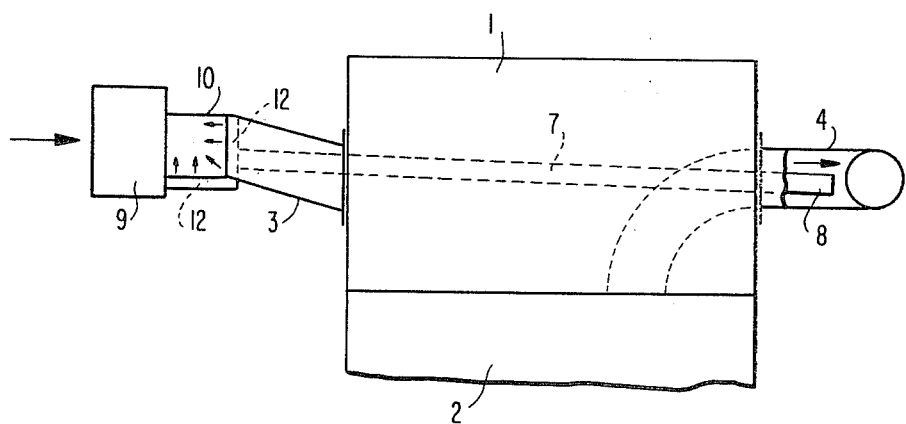
FIG. 2 is a schematic end elevational view, similar to FIG. 1, of a modified embodiment of an internal combustion engine provided with a preheating installation in accordance with the present invention.
Figure 3:
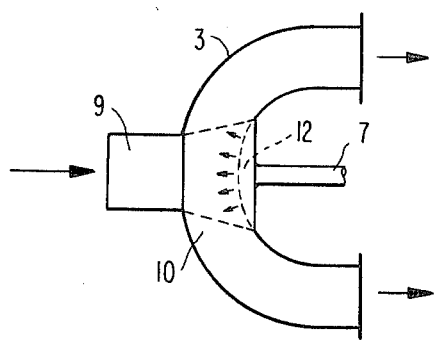
FIG. 3 is a plan view on the suction pipe system including the carburetor of the internal combustion engine according to FIG. 2.

In the internal combustion engine corresponding to the second embodiment illustrated in FIGS. 2 and 3, which differs from that illustrated in FIG. 1 essentially by a construction of the carburetor 9 as horizontal carburetor, the same parts are designated by the same reference numerals as in FIG. 1. The heat pipe 7 projects in this case with its evaporator 8 directly into the exhaust gas line system 4 whereas with its condenser constructed as flat condenser jacket 12, on the one hand, it extends directly up to the carburetor 9 underneath the suction pipe 10 laterally adjoining the carburator 9 and, on the other hand, is drawn-up along the side of the suction pipe 10 opposite the carburetor 9 along the wall thereof.

In both embodiments, the flat condenser jacket 12 forms at the same time a preheating place designated as "hot spot" with the prior art mixture preheating systems using exhaust gases conducted directly to the suction pipe, which already after an initial operating period of the internal combustion engine precludes any precipitation of liquid fuel particles in the suction pipe system without thereby constricting the suction cross section. Of course, the suction pipe wall including the suction pipe cross section is thereby formed directly by a wall part of the flat condenser jacket 12 whereby the end of the heat pipe 7 which forms the heat-emission or heat-transfer zone may be embedded according to FIG. 1 in the suction pipe 10. In this manner, a very good heat transfer with a relatively large transfer surface and with a very short response time of the heating installation during cold start results therefrom.

By an appropriate selection of the heat pipe and of the heat transfer medium thereof, it can be achieved that a constant heat quantity is given off on the condenser side independently of the heat supply on the evaporator side. An excessive heating of the suction mixture which would reduce the volumetric efficiency of the internal combustion engine can be avoided thereby in the full-load range.

The internal combustion engine provided with the preheating installation according to the present invention could be constructed also in any other manner without lessening the achieved advantageous effect of the preheating installation, for example, as counterflow engine or with any other carburetor construction.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for preheating a suction mixture of a carburetor internal combustion engine which includes a cross-flow cylinder head, an exhaust gas line system and a suction pipe system, the installation comprising heat pipe means having a heat-absorption zone and a heat transmission zone, the heat pipe means extends from a portion of the exhaust gas line system to a portion of the suction pipe system, characterized in that the heat pipe means extends through the cross-flow cylinder head to a lower part of a suction pipe of the suction pipe system directly adjoining an outlet of the carburetor, the heat transmission zone includes a flat condenser jacket which partly surrounds a flow channel of the suction pipe from below along a wall surface area thereof while leaving substantially free the main part of the cross-section of the suction pipe.

2. An installation according to claim 1, characterized in that the flat condenser jacket means is drawn up from the bottom of the suction pipe adjoining the carburetor along at least one of the side walls thereof.

3. An installation according to claim 1, wherein the internal combustion engine includes a working cylinder and an exhaust channel extending therefrom, characterized in that the heat-absorption zone of the heat pipe means projects into the exhaust channel.

4. An installation according to claim 1, characterized in the the heat absorption zone projects into a portion of the exhaust gas line system.

5. An installation according to claim 2, wherein the internal combustion engine includes a working cylinder and an exhaust channel extending therefrom, characterized in that the heat-absorption zone of the heat pipe means projects into the exhaust channel.

6. An installation according to claim 2, characterized in that the heat absorption zone projects into a portion of the exhaust gas line system.

* * * * *